US009289701B2

United States Patent
Laros et al.

(10) Patent No.: US 9,289,701 B2
(45) Date of Patent: *Mar. 22, 2016

(54) OPEN-CHANNEL FEED DILUTION SYSTEM FOR A THICKENER OR SETTLING TANK

(75) Inventors: Timothy John Laros, Park City, UT (US); Frank Andrew Baczek, Holladay, UT (US)

(73) Assignee: FLSMIDTH A/S (DK)

( * ) Notice: Subject to any disclaimer, the term of this patent is extended or adjusted under 35 U.S.C. 154(b) by 172 days.

This patent is subject to a terminal disclaimer.

(21) Appl. No.: 13/993,475

(22) PCT Filed: Dec. 9, 2011

(86) PCT No.: PCT/US2011/064060
  § 371 (c)(1),
  (2), (4) Date: Jun. 12, 2013

(87) PCT Pub. No.: WO2012/082530
  PCT Pub. Date: Jun. 21, 2012

(65) Prior Publication Data
  US 2013/0256243 A1 Oct. 3, 2013

Related U.S. Application Data

(60) Provisional application No. 61/422,253, filed on Dec. 13, 2010.

(51) Int. Cl.
  *B01D 21/24* (2006.01)
  *B01D 21/00* (2006.01)
  *B01D 21/06* (2006.01)
  *B01D 21/08* (2006.01)

(52) U.S. Cl.
  CPC ............ *B01D 21/0024* (2013.01); *B01D 21/06* (2013.01); *B01D 21/08* (2013.01); *B01D 21/2411* (2013.01); *B01D 21/2427* (2013.01); *B01D 21/2488* (2013.01)

(58) Field of Classification Search
  CPC ............... B01D 21/08; B01D 21/0024; B01D 21/2405; B01D 21/2411; B01D 21/2427; B01D 21/2488
  USPC .................. 210/712, 738, 801, 519
  See application file for complete search history.

(56) References Cited

U.S. PATENT DOCUMENTS 2,185,785 A   1/1940   Dorr et al.
4,278,541 A   7/1981   Eis et al.

(Continued)

FOREIGN PATENT DOCUMENTS

WO   2009/137865 A1   11/2009
WO   2010/097762 A1   9/2010

OTHER PUBLICATIONS

International Search Report and Written Opinion dated Apr. 18, 2012, 9 pages.

*Primary Examiner* — Christopher Upton
(74) *Attorney, Agent, or Firm* — Jeffrey A. Sharp; Aaron M. Pile; Matthew R. Weaver

(57) ABSTRACT

An open-channel infeed conduit of a feed dilution system of a thickener/clarifier settling tank is provided with orifices between its upstream inlet end and its outlet end. The orifices are positioned proximate to and in fluid communication with the clarified liquid phase in the tank to draw clarified liquid from the tank into the conduit responsive to or by virtue of momentum transfer between the flow of the liquid slurry feed stream in the conduit and the clarified liquid in the tank.

26 Claims, 5 Drawing Sheets

(56) References Cited

U.S. PATENT DOCUMENTS

| | | |
|---|---|---|
| 4,512,895 A | 4/1985 | Reid |
| 5,147,556 A | 9/1992 | Taylor |
| 5,340,485 A | 8/1994 | Bradley et al. |
| 5,389,250 A | 2/1995 | Wood et al. |
| 7,988,865 B2 * | 8/2011 | Laros et al. .................... 210/519 |
| 2008/0110839 A1 * | 5/2008 | Foreman et al. ............... 210/801 |
| 2013/0193088 A1 * | 8/2013 | Echeverri ....................... 210/788 |
| 2013/0240457 A1 * | 9/2013 | Laros ............................. 210/738 |
| 2014/0175020 A1 * | 6/2014 | Laros ............................. 210/738 |

\* cited by examiner

OPEN-CHANNEL FEED DILUTION SYSTEM FOR A THICKENER OR SETTLING TANK

BACKGROUND OF THE INVENTION

This invention relates to thickener/clarifier settling tanks used to separate liquid and solid components of an influent feed slurry and specifically relates to feedwell apparatus employed in such thickener/clarifiers to enhance the clarification process. More specifically, the invention relates to a feed dilution system that delivers a diluted solids slurry to a feedwell of a thickener or clarifier tank.

Thickener/clarifier settling tanks are used in a wide variety of industries to separate influent feed slurry comprising a solids, or particulate material, containing fluid to produce a "clarified" liquid phase having a lower concentration of solids than the influent feed slurry and an underflow stream having a higher concentration of solids than the influent feed slurry. Thickener/clarifier tanks conventionally comprise a tank having a floor and a continuous wall, which define a volume within which the clarification process takes place. Thickener/clarifier tanks also include an influent feed conduit for delivering influent feed to the tank, an underflow outlet for removing settled solids from the tank and a fluid discharge outlet for directing clarified liquid away from the tank. Thickener/clarifier tanks may also include a rake assembly having rake arms for sweeping along the floor of the tank and may further include an overflow launder or bustle pipe for collecting clarified liquid near the top of the tank.

Thickener/clarifier settling tanks of the type described operate by introducing an influent feed stream into the volume of the tank where the influent is retained for a period long enough to permit the solids to settle out by gravity from the fluid. The solids that settle to the bottom of the tank produce a sludge or solids bed near the bottom of the tank, which is removed through the underflow outlet. Clarified liquid is formed at or near the top of the thickener/clarifier tank and is directed away from the tank for further processing or disposal. Settling of solids may be enhanced in some applications by the addition of a flocculant or polymer that forms agglomerates that settle more readily. In many applications, an objective of fluid clarification is to enhance the settling process to achieve a high throughput of solids, and thereby enhance solids recovery.

Many thickener/clarifier settling tanks are constructed with a feedwell, usually centrally located within the tank, into which the influent feed slurry stream is delivered. The feedwell generally serves the purpose of reducing the fluid velocity of the incoming influent feed stream so that the energy in the stream may be dissipated to some degree before entering the tank. Dissipation of energy in the influent feed stream lessens the disruptive effect that the incoming influent feed stream has on the settling rate of the solids in the tank. In other words, introduction into a thickener/clarifier of an influent feed stream under high fluid velocity tends to cause turbulence in the tank and compromises the settling rate of solids. A feedwell may be structured in a variety of ways, therefore, to create or enhance dissipation of energy in the influent feed. For example, the feedwell and influent feed pipe may be structured to introduce influent feed to the feedwell at two opposing directions and into an annular space, such as is disclosed in U.S. Pat. No. 4,278,541 to Eis, et al.

In many feedwell assemblies, the influent feed pipe is incorporated into a dilution feed system including a mixing conduit with a downstream end connected to the feedwell and an upstream end with an eductor structure that delivers both a solids stream or slurry from a feed pipe and a diluting liquid from the clarified liquid at the top of the settling tank. The feed pipe is provided at its outlet end with a nozzle having a circular outlet opening located towards the upstream inlet end of the mixing conduit.

The mixing conduit may take the form of a classical submerged pipe or tube or alternatively an open channel form in which a mixing zone is open to the atmosphere. It has been observed that mixing of the incoming solids slurry with thickener overflow or dilution liquor is generally less complete or effective in the open channel design. It has been observed further that the dilution liquor stream tends to flow along the wall of the mixing channel, outside of the concentrated solids jet from the feed pipe nozzle, and only partially mixes with the concentrated solids jet. This type of performance is not ideal for a feed slurry dilution device that may also be mixing flocculant with a diluted slurry prior to entering a gravity thickener since a combined slurry stream entering the thickener or feedwell should be well flocculated and also diluted to a substantially uniform concentration of solids across the entire cross-sectional area of the mixing channel.

OBJECTS OF THE INVENTION

It is an object of the present invention to provide an improved feed dilution system for a feedwell assembly of a thickener/clarifier/settling tank.

A more specific object of the present invention is to provide such a feed dilution system that increases the degree of dilution of a feed stream entering a feedwell.

Another specific object of the present invention is to provide such a feed dilution system that is inexpensive and has a minimum of moving parts and is consequently reliable and low in required maintenance.

Another object of the present invention is to provide a method for the dilution of an incoming slurry feed stream to a feedwell assembly of a thickener/clarifier/settling tank.

These and other objects of the present invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A thickener/clarifier apparatus in accordance with the present invention comprises a settling tank, a feedwell body disposed inside the tank, at least one open-channel infeed or mixing conduit disposed in the tank, and an eductor structure at an upstream inlet end of the conduit. The tank provides the conditions for settling of particulate material residing within liquid contained within the tank and facilitates the formation of a clarified liquid phase in an upper region of the tank. The open-channel infeed conduit includes outer sides and communicates at an outlet end with the feedwell body for delivering thereto a liquid slurry feed stream. The eductor structure initially dilutes the slurry feed stream with clarified liquid from the tank. Pursuant to the present invention, the conduit is provided with at least one orifice between its upstream inlet end and its outlet end. The orifice is positioned proximate to and in fluid communication with the clarified liquid phase in the tank to draw clarified liquid from the tank into the conduit responsive to or by virtue of momentum transfer between the flow of the liquid slurry feed stream in the conduit and the clarified liquid in the tank.

The orifice is preferably one of a plurality of orifices disposed in an upper wall or outer side portion of the conduit between the upstream inlet end and the outlet end of the infeed conduit and positioned proximate to and in fluid communication with the clarified liquid phase in the tank so as to draw clarified liquid from the tank into the conduit in response to, or by virtue of, momentum transfer between the flow of the liquid slurry feed stream in the conduit and the clarified liquid in the tank.

The orifices may be provided in pairs, members of each pair being disposed transversely across the conduit from one another in opposing sidewalls of the infeed conduit.

The orifices may be disposed at different vertical elevations along a sidewall of the infeed conduit. More specifically, the orifices may include at least one orifice located at a first distance from an upper edge of the respective sidewall of the infeed conduit and at least another orifice located at a second distance from the upper edge of the respective sidewall, the second distance being substantially greater than the first distance.

The orifices may be of various shapes and sizes, including circular, oval, elongate, triangular, chevron-shaped, rectangular, or rhomboid.

The orifices may be provided with respective flow guides connected to and extending outwardly from an outer side of the conduit. The flow guides are located adjacent to the respective orifices on a downstream side thereof. The flow guides may extend over and overlap at least a portion of the respective orifices. The flow guides may have a shape that parallels or corresponds to the shape of the given one of the orifices.

An associated feedwell assembly for a thickener/clarifier tank comprises, in accordance with the present invention, a feedwell body disposable inside the tank, at least one open-channel infeed conduit disposable in the tank and communicating at an outlet end with the feedwell body for delivering thereto a liquid slurry feed stream, and an eductor structure at an upstream or inlet end of the conduit and disposable inside the tank for diluting the slurry feed stream with clarified liquid from the tank. The conduit includes outer sides and is provided with at least one orifice between the upstream or inlet end and the outlet end. The orifice is positionable proximate to and in fluid communication with the clarified liquid phase in the tank to draw clarified liquid from the tank into the conduit responsive to or by virtue of momentum transfer between the flow of the liquid slurry feed stream in the conduit and the clarified liquid in the tank. As indicated above, the orifice is preferably one of a plurality of orifices disposed in an upper wall or side portion of the conduit between the upstream end and the outlet end of the infeed conduit and positionable proximate to and in fluid communication with the clarified liquid phase in the tank so as to draw clarified liquid from the tank into the conduit in response to, or by virtue of, momentum transfer between the flow of the liquid slurry feed stream in the conduit and the clarified liquid in the tank.

The orifices are optionally provided with respective flow guides connected to and extending outwardly from an outer side of the conduit.

The present invention provides an improved feed dilution system for a feedwell assembly of a thickener/clarifier/settling tank. The invention increases the degree of dilution of a feed stream entering a feedwell without adding system head. Moreover, the invention reduces the hydraulic jump at the discharge of the open channel mix tube or infeed conduit into the thickener feedwell.

These advantages are achieved with a minimum of expense. An improved feed dilution system as described herein does not entail an increase in maintenance outlays or apparatus downtime, owing in part to the absence of additional moving parts such as extra dilution pumps or mixers.

The present invention provides a surprising end result, inasmuch as the supplemental dilution openings of the prior art, which are taught for inclusion in closed tubular infeed conduits, simply do not work. It is demonstrable that in such prior art systems, slurry passes out of the tubular infeed pipes via the openings provided in the infeed pipes. Accordingly, the prior art disinclines one from providing supplemental dilution openings or orifices in slurry infeed conduits of thickener/clarifiers systems. It is a surprising result, contrary to the prior art, that the supplemental dilution openings work in open channel infeed or mixing conduits.

Furthermore, the present invention provides a method of diluting an incoming slurry feed stream eventually flowing into the feedwell assembly of a thickener/clarifier tank, said method including the steps of flowing the incoming slurry feed stream into the inlet end of the open-channel infeed conduit, drawing clarified liquid from the tank into the infeed conduit through one or more orifices provided in the infeed conduit in response to or by virtue of momentum transfer between the flow of said flowing slurry feed stream in said conduit and the clarified liquid in the tank, allowing the slurry feed stream to be diluted by and mix with the drawn in clarified liquid inside the infeed conduit thereby producing a diluted and mixed slurry feed stream, and flowing the resulting diluted and mixed slurry feed stream through the outlet end of the infeed conduit into the feedwell. Said method could further include the additional steps of providing an eductor structure proximate the infeed conduit inlet for initial dilution of the slurry feed stream and variously flocculating the slurry feed stream, clarified liquid, and/or the combination of the two.

DEFINITIONS

Figure 1:
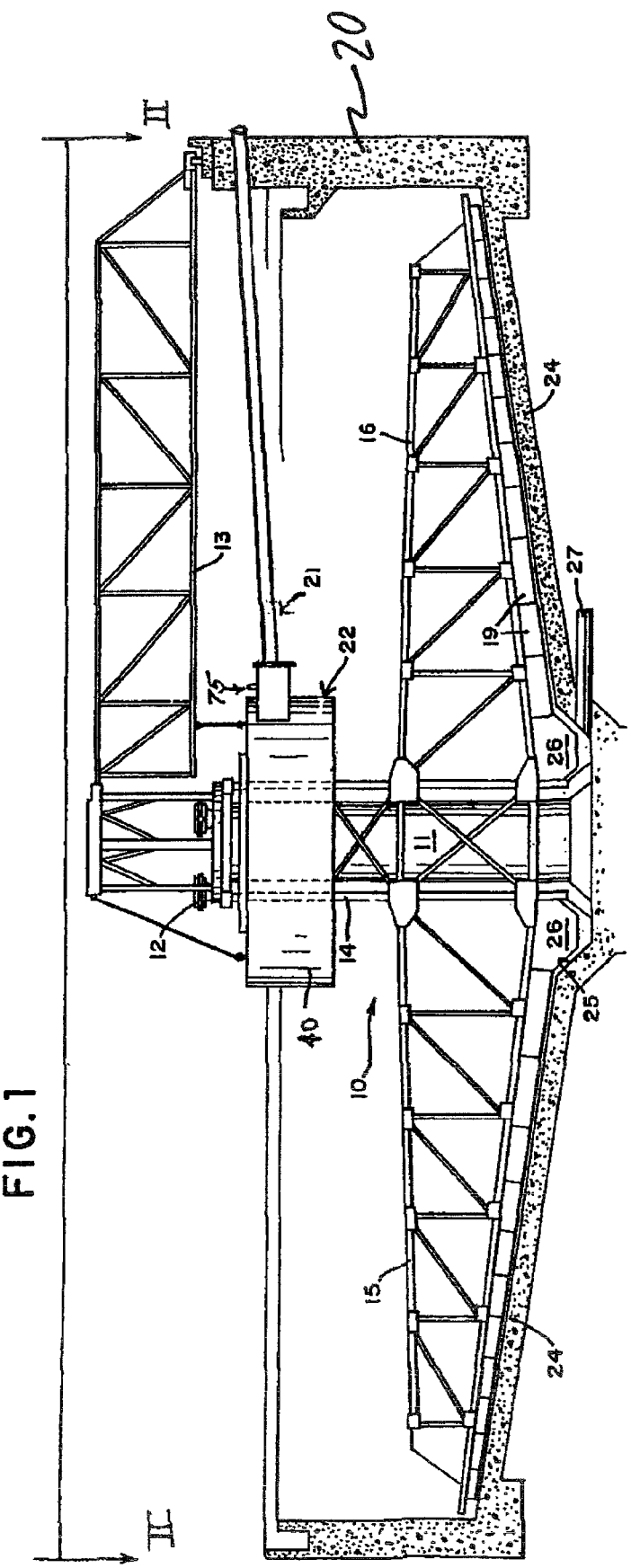
FIG. 1 is a vertical sectional view of a thickener/clarifier tank having a center pier supporting a rotating sludge raking structure and a feedwell assembly with a feed dilution system in accordance with the present invention.

The term "open channel" is used herein with respect to a slurry infeed or mixing conduit to indicate that the conduit is open to the ambient air, perhaps along an upper side. The pressure within the conduit is therefore contained within appreciable limits.

The term "upper wall portion" when applied herein to a feedwell infeed conduit refers to any portion of the conduit other than a bottom or under wall panel thereof. The upper wall portion is typically a vertical panel or a substantially vertically oriented wall section, although it may be oriented otherwise depending on the overall shape of the infeed conduit which could be generally u-shaped, v-shaped, rectangular, semi-rectangular, semi-circular or half-piped, etc. Infeed dilution orifices generally do not function if placed in a lower panel of an open channel infeed conduit, as gravity would operate to direct slurry out of the infeed conduit through such an orifice.

The term "flow guide" is used herein to denote a deflector or scoop-shaped element that is provided on an outer surface or outer side of a slurry infeed conduit in association with a dilution orifice in the conduit wall to enhance flow of clarified liquid phase into the conduit via the orifice. Relative to the slurry flow in the conduit, the flow guide is generally located towards the downstream side of the orifice. Typically, the flow guide is adjacent to the respective orifice and extends over or overlaps at least a portion of the orifice. A flow guide may have a shape that echoes or parallels the shape of the respective orifice. Thus, if the orifice is circular or oval, the flow guide has a boundary that is a circular or oval sector. If the orifice is triangular, rhomboidal or chevron-shaped, the flow guide may include two flat plates connected to one another along a linear joint. If the orifice is rectangular or square, the flow guide may include a rectangular or square plate that is inclined at an acute angle relative to the outer surface of the conduit at the orifice. In the latter case, the flow guide may further include a pair of triangular upper and lower side elements each connected along one edge to the rectangular or square guide plate and along another edge to the wall of the conduit. The various flow guides may be wholly separate elements or be cut, bent, formed and/or shaped from the outer side of the slurry infeed conduit itself.

The term "supplemental feed dilution orifice" or "feed dilution orifice" or simply "orifice" is used herein to denote a hole or opening in a wall or panel of an open channel slurry infeed conduit of a feedwell assembly of a thickener/clarifier tank, where the hole or opening is located downstream of the upstream or inlet end of the open channel conduit, which may further also include an eductor structure, and upstream of the outlet end of the open channel conduit, which empties into a feedwell body. The feed dilution orifice is so disposed in the wall of the conduit that the orifice is located in a clarified liquid region of the tank. Clarified liquid is drawn from the tank into the infeed conduit through the orifice owing to a momentum transfer process. Such momentum transfer will not occur if the conduit is closed or submerged, that is, if it is a tubular member or pipe submerged and not open to the ambient atmosphere, because the internal pressures of the flowing slurry are inevitably so high as to prevent fluid from entering the closed conduit through the orifice.

DETAILED DESCRIPTION

Figure 2:
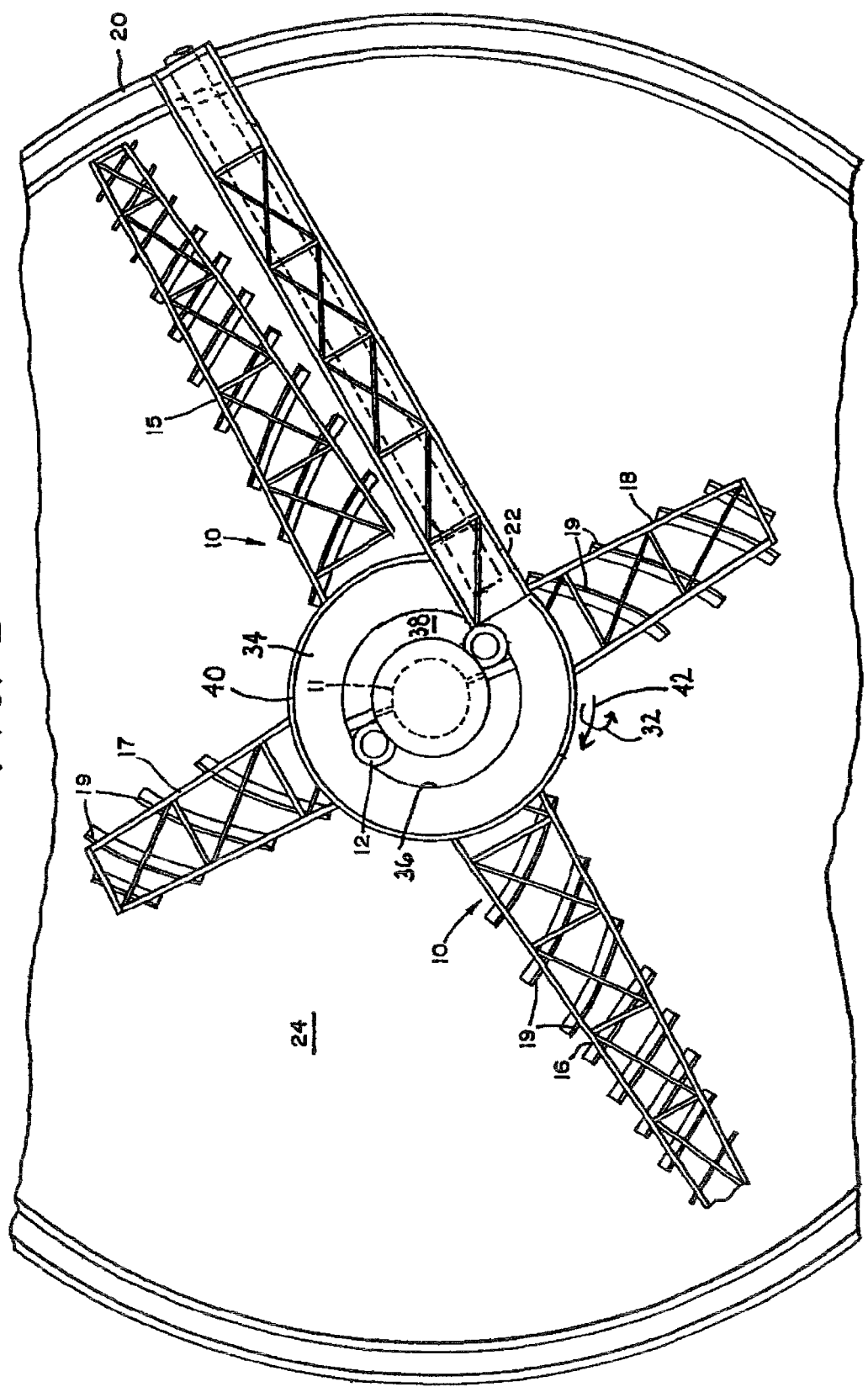
FIG. 2 is a plan view of the thickener/clarifier tank of FIG. 1, taken on line II-II in FIG. 1.

As illustrated in FIGS. 1 and 2, a thickener/clarifier comprises a continuously operating thickening or settling tank 20 wherein a sludge raking structure 10 is supported for rotation upon a center pier 11. A drive mechanism 12 of any suitable known construction is mounted atop the pier providing the driving torque for the rake structure. The pier also supports the inner end of an access bridge 13.

Rake structure 10 comprises a central vertical cage portion or cage 14 surrounding the pier 11, and rake arms of girder like construction extending rigidly from the cage. Rake structure 10 has one pair of long rake arms 15 and 16 opposite to one another, and a pair of short rake arms 17 and 18 disposed at right angles thereto, all arms having sludge impelling or conveying blades 19 fixed to the underside thereof.

Rake structure 10 operates in a settling tank 20 to which a feed suspension or feed pulp is supplied through a feed dilution system 21 terminating in a cylindrical feedwell body 22 which surrounds the top end portion of the rake structure and is supported by pier 11.

Tank 20 may be of usual construction, comprising a bottom 24 of shallow inverted conical inclination, and formed with an annular sump 25 around the pier, to which settled solids or sludge are conveyed by rake structure 10. Scraper blades 26, unitary with rake structure 10 and substantially conforming to the profile of sump 25, move the collected sludge to a point of delivery from the sump, as by way of a discharge pipe 27.

Feed dilution system 21 is functionally connected at a downstream end to feedwell body 22. Feedwell body 22 has an annular floor panel 34 (FIG. 2) with an inner edge 36 defining a circular opening 38 and an outer edge contiguous with a cylindrical sidewall 40 of the feedwell body. Feed dilution system 21 is connected to feedwell body 22, perhaps to the feedwell sidewall 40, so as to deliver slurry stream 42 to flow along a circular path inside the feedwell body. Slurry stream 42 has a substantially circular inner boundary located generally above inner edge 36 and a substantially circular outer boundary located adjacent feedwell sidewall 40. The inner and outer boundaries extend parallel to the path of the slurry stream 42.

Figure 3:
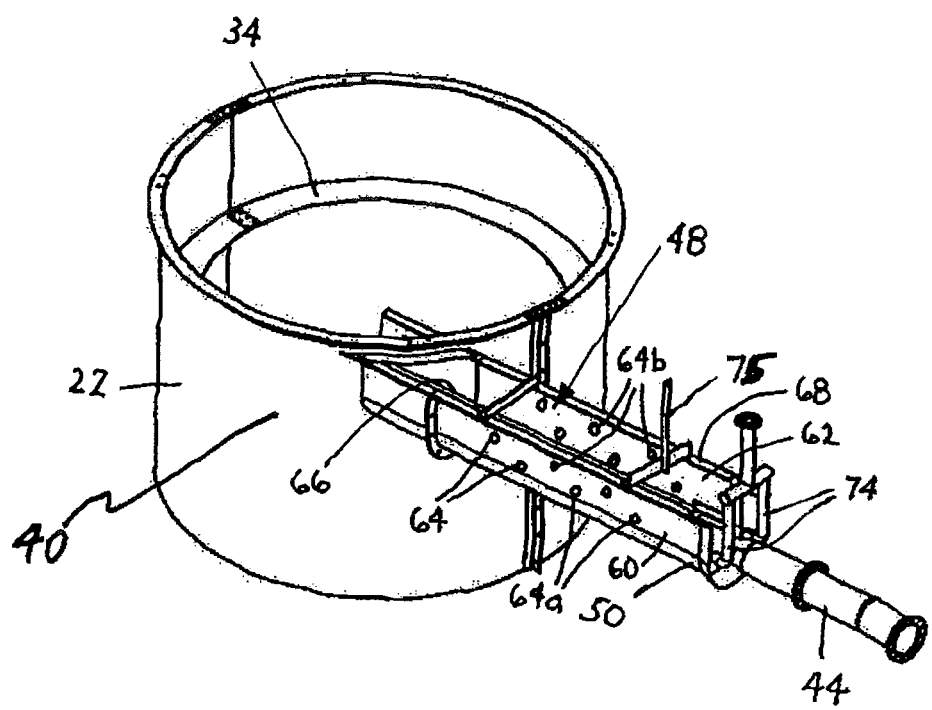
FIG. 3 is a schematic perspective view of a feedwell assembly with a feed dilution system in accordance with the present invention, showing supplemental feed dilution orifices in an open-channel infeed or mixing conduit, in accordance with the present invention.
Figure 4:
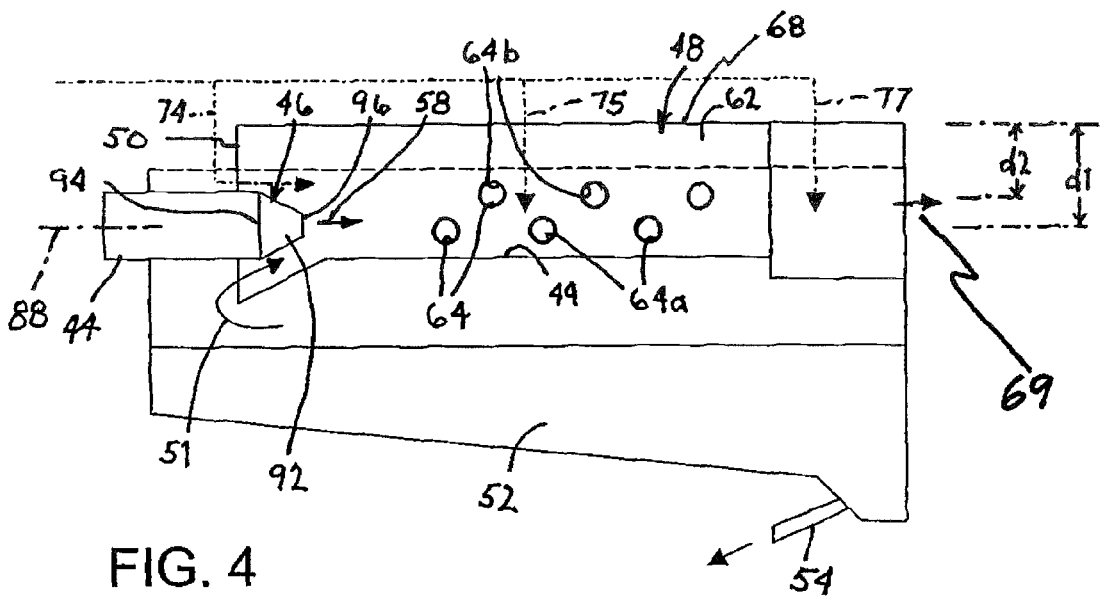
FIG. 4 is a schematic vertical cross-sectional view of the feed dilution system of FIG. 3.

As depicted in FIG. 3 and more schematically in FIG. 4, feed dilution system 21 includes a slurry or solids feed pipe 44, a nozzle 46 attached to a downstream end of the feed pipe, and a mixing conduit 48 in the form of an open channel having lower corners 49 (only one shown). Feed dilution system 21 may be defined to further include feedwell body 22. At least a portion of nozzle 46 is disposed proximate an upstream or inlet end 50 of mixing conduit 48. A downstream end of mixing conduit 48 may be attached to feedwell sidewall 40 so that the mixing conduit 48 communicates with the feedwell. In FIG. 4, reference designation 52 represents a bed of settled solids in settling tank 20, pipe 54 being provided for removing the thickened underflow.

Nozzle 46 (FIG. 4) may comprise a nozzle body 92 having an inlet end 94 and an outlet end 96, the outlet end being provided with outlet opening (not shown) that ejects a slurry stream 58 into conduit 48. The positioning of nozzle 46 relative to upstream end 50 of mixing conduit 48 may form an eductor structure as described in U.S. Pat. No. 5,389,250. By means of momentum transfer responsive to the movement of the incoming slurry feed stream 58, the eductor entrains or draws clarified liquid from an upper region of settling tank 20 (arrow 51) and further draws that clarified liquid into the slurry stream inside mixing conduit 48, for purposes of further, or supplementally, diluting the slurry stream within the mixing conduit 48, prior to, and even for after, delivery of the outgoing slurry stream 69 on and into feedwell body 22.

As depicted in FIGS. 3 and 4, conduit 48 is provided in opposing substantially vertical sides or sidewalls 60 and 62 with openings 64 that serve as supplemental dilution orifices or ports for enabling the drawing of additional clarified liquid from tank 20 into mixing or infeed conduit 48. Orifices 64 are positioned proximate to and in fluid communication with clarified liquid phase in tank 20 to draw clarified liquid from the tank into conduit 48 in response to or by virtue of momentum transfer between the flowing liquid slurry feed stream 58 in conduit 48 and the clarified liquid in tank 20.

Orifices 64 may be disposed in pairs aligned with one another in sidewalls 60 and 62 across open channel conduit 48. As shown, orifices 64 may include a first set of orifices 64*a* each disposed at one vertical position relative to lower corners 49 and a second set of orifices 64*b* each disposed at a different vertical position relative to lower corners 49. Alternatively phrased, orifices 64*a* and 64*b* may be disposed at different distances d1 and d2 from upper edges 66 and 68 of conduit sidewalls 60 and 62.

Flocculant may be delivered via a tube 74 into the dilution fluid or supernatant flow 66 at upstream end 50 of mixing conduit 48 and additionally at points 75, 77 further downstream along the mixing conduit 48. Flocculant may also, additionally or alternatively, be delivered via a tube (not shown) located adjacent to one or more of the orifices 64 such that the flocculant is educted into the mixing conduit 48 along with the clarified dilution liquid.

Figures 5, 6:
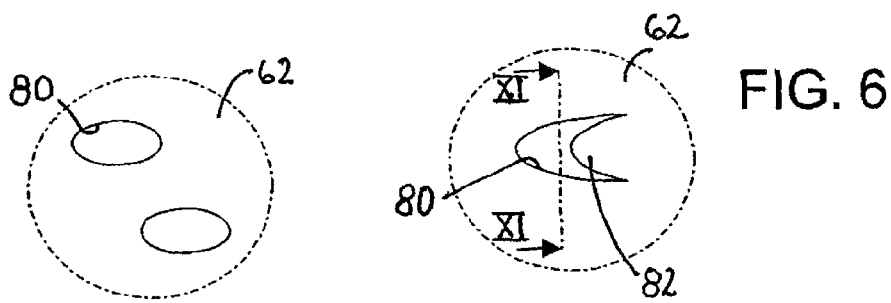
FIG. 5 is a partial side elevational view of a sidewall of the open-channel infeed or mixing conduit of FIGS. 3 and 4, showing an alternative orifice configuration.
FIG. 6 is a partial side elevational view, showing a modification of the orifice configuration of FIG. 5.
Figure 11:
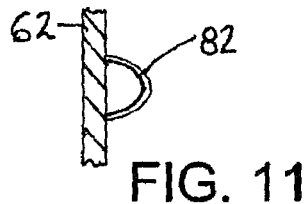
FIG. 11 is a partial transverse cross-sectional view taken along line XI-XI in FIG. 6.

Orifices 64 may be variously placed in sidewalls 60 and 62 and may have any of a variety of shapes. FIG. 5 shows sidewall 60 or 62 of infeed conduit 48 provided with oval slurry dilution orifices 80 that are elongated in the direction of slurry flow 58 (FIG. 4). As depicted in FIGS. 6 and 11, sidewalls 60 and 62 of infeed conduit 48 may be further provided with outwardly extending flow guides 82 in association with each orifice 80, which function as scoops for directing clarified liquid into conduit 48 through the respective orifices 80. Flow guides 82 are each generally in the form of an ovoid section connected to sidewall 60, 62 about the lip of the respective orifice 80. Flow guides 82 may be formed separately and welded to sidewalls 60, 62. Alternatively, flow guides 82 may be bent and shaped from the sidewall 60, 62 itself during the formation of the respective orifices 80.

Figures 7, 8:
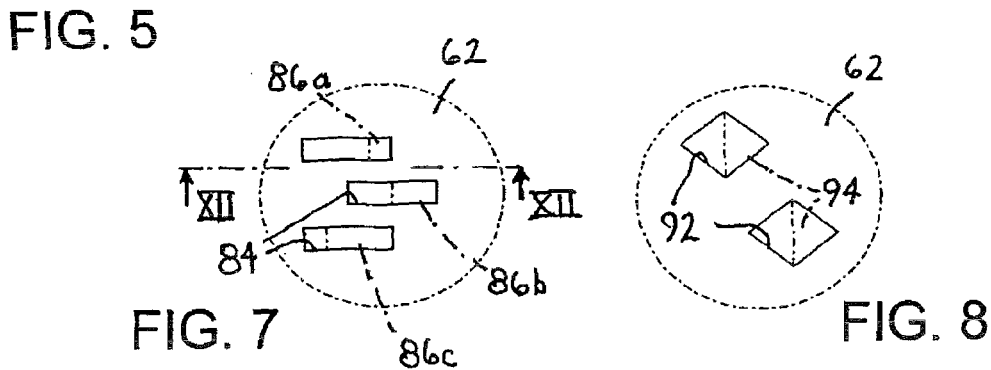
FIG. 7 is a partial side elevational view of a sidewall of the open-channel infeed or mixing conduit of FIGS. 3 and 4, showing another alternative orifice configuration.
FIG. 8 is a partial side elevational view of the open-channel infeed or mixing conduit of FIGS. 3 and 4, showing a further alternative orifice configuration.
Figure 12:
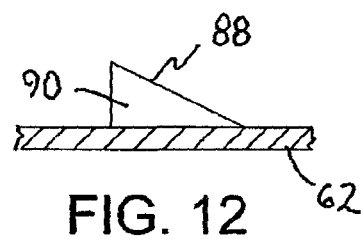
FIG. 12 is a partial transverse cross-sectional view taken along line XII-XII in FIG. 7.

FIG. 7 illustrates sidewall 60 or 62 of infeed conduit 48 provided with rectangular slurry-dilution orifices 84 that are elongated in the direction of slurry flow 58. As depicted in FIG. 7, sidewalls 60 and 62 of infeed conduit 48 may be further provided with outwardly extending flow guides 86*a*, 86*b*, 86*c* (three sizes shown) adjacent each orifice 84, which serve as scoops or deflectors for guiding clarified liquid into conduit 48 via the respective rectangular orifices 84. Flow guides 86*a*, 86*b*, 86*c* each have a generally prismatic form with a rectangular main plate 88 and two triangular wings 90 (FIG. 12). Flow guides 86*a*, 86*b*, 86*c* may be formed separately and welded to sidewalls 60, 62. Alternatively, main plates 88 of flow guides 86*a*, 86*b*, 86*c* may be cut from and bent away from the sidewall 60, 62 during the formation of the respective orifices 84.

As shown in FIG. 8, sidewall 60 or 62 of infeed conduit 48 may be provided with rhomboid-shaped slurry-dilution orifices 92, optionally elongated in the direction of slurry flow 58. Sidewalls 60 and 62 of infeed conduit 48 may be additionally furnished with outwardly projecting flow guides 94 (only one of different possible sizes shown) adjacent each orifice 92, which serve as scoops or deflectors for channeling clarified liquid into conduit 48 via the respective rhomboidal orifices 92. Flow guides 94 each define a generally pyramidal volume and include a triangular main plate and two triangular wings (compare FIGS. 8 and 12). Flow guides 94 may be formed separately and welded to sidewalls 60, 62. Alternatively, the main plates of flow guides 94 may be cut from and bent away from the sidewall 60, 62 during the formation of the respective orifices 92.

Figure 9:
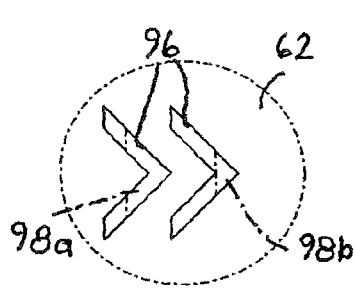
FIG. 9 is a partial side elevational view of a sidewall of the open-channel infeed or mixing conduit of FIGS. 3 and 4, showing an additional alternative orifice configuration.

FIG. 9 depicts sidewall 60 or 62 of infeed conduit 48 provided with chevron-shaped slurry-dilution orifices 96 that point like arrowheads in the direction of slurry flow 58. Sidewalls 60 and 62 of infeed conduit 48 may also exhibit outwardly projecting flow guides 98*a*, 98*b* (two possible sizes shown) adjacent each orifice 96. Flow guides 98*a* each define a generally pyramidal volume and include a triangular main plate and two triangular wings (compare FIGS. 9 and 12). Flow guides 98*b* have a pyramidal base portion and a pair of frusto-pyramidal wings.

Figure 10:
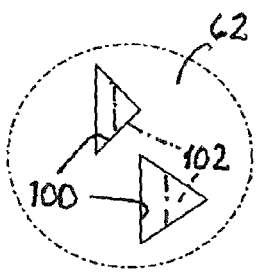
FIG. 10 is a partial side elevational view of the open-channel infeed or mixing conduit of FIGS. 3 and 4, showing yet another alternative orifice configuration.

FIG. 10 illustrates sidewall 60 or 62 of infeed conduit 48 provided with triangular slurry-dilution orifices 100. Sidewalls 60 and 62 may be supplemented with outwardly projecting flow guides 102 (only one of different possible sizes shown) adjacent each orifice 100. Flow guides 102 each define a generally pyramidal volume and include a triangular main plate and two triangular wings (compare FIGS. 10 and 12). Flow guides 102 may be formed separately and welded to sidewalls 60, 62. Alternatively, the main plates of flow guides 102 may be cut from and bent away from the sidewall 60, 62 during the formation of the respective orifices 100.

Figure 13:
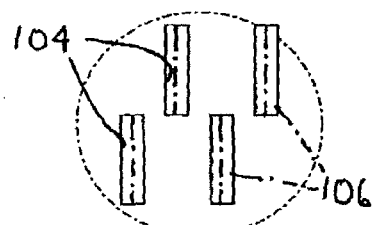
FIG. 13 is a partial side elevational view of the open-channel infeed or mixing conduit of FIGS. 3 and 4, showing yet a further alternative orifice configuration.

FIG. 13 illustrates sidewall 60 or 62 of infeed conduit 48 as provided with rectangular slurry-dilution orifices 104 that are elongated in a vertical direction, generally perpendicular to slurry flow 58. Sidewalls 60 and 62 may be provided with outwardly extending flow guides 106 adjacent each orifice 104. Flow guides 106 each define a prismatic volume with an elongate rectangular main plate and two triangular wings (see FIG. 12).

It can be observed that the flow guides 82, 86*a*, 86*b*, 86*c*, 94, 98*a*, 98*b*, 102 and 106 generally minor or match to some extent the geometric shapes of the respective orifices 80, 84, 92, 96, 100, and 104. This is a natural consequence in some cases of the flow guides being formed in part of material cut from the conduit wall 60 or 62 during the formation of the respective orifices. In some cases, depending on various factors such as the type of infeed slurry and the flow response of the diluting fluid or liquid, non-matching flow guide shapes may be used or even preferred.

It is to be noted that infeed conduit 48 may be provided with orifices 64 (FIGS. 3 and 4) of different shapes and sizes. For instance, orifices located upstream, closer to upstream end 50 of conduit 48, might be rectangular or square (FIGS. 7, 13), while downstream orifices located closer to feedwell body 22 might be circular or oval (FIGS. 3-6). Thus, the selection of orifice shape may vary in accordance with longitudinal position along conduit 48.

Furthermore, orifices 64 may be located in two levels, an upper level and a lower level, as illustrated in FIGS. 3 and 4. Alternatively, the orifices might be located all at the same level, in a linear array, or in groups or clusters. Other arrangements and configurations might occur to those skilled in the art.

In addition to the previously described apparatus, the present invention provides a method of diluting an incoming slurry feed stream eventually flowing into the feedwell assembly of a thickener/clarifier settling tank, said method including the steps of flowing the incoming slurry feed stream into the inlet end of the open-channel infeed conduit, drawing clarified liquid from the tank into the infeed conduit through one or more orifices provided in the infeed conduit in response to or by virtue of momentum transfer between the flow of said flowing slurry feed stream in said conduit and the clarified liquid in the tank, allowing the slurry feed stream to be diluted by and mix with the drawn in clarified liquid inside the infeed conduit thereby producing a diluted and mixed slurry feed stream, and flowing the resulting diluted and mixed slurry feed stream through the outlet end of the infeed conduit into the feedwell. Said method could further include the additional steps of providing an eductor structure proximate the infeed conduit inlet for initial dilution of the slurry feed stream and variously flocculating the slurry feed stream, clarified liquid, and/or the combination of the two.

Although the invention has been described in terms of particular embodiments, methods and applications, one of ordinary skill in the art, in light of this teaching, can generate additional embodiments, methods and modifications without departing from the spirit of or exceeding the scope of the claimed invention. It is believed that the invention is useful only in feedwell assemblies having slurry infeed conduits of the open channel type and is particularly useful in such feedwell assemblies having eductor structures for primary or at least initial slurry dilution at the upstream input or inlet ends of the open-channel infeed conduits. The invention is believed to be effective with singular or multiple infeed paths, with or without spill lips (i.e., annular bottom panels or shelves in the feedwell bodies), etc. In addition, the open channel infeed conduit 48 may have any cross-sectional shape including, by way of example, diamond or square, rectangular, triangular or V-shaped, trough or U-shaped, semi-circular or half-piped.

Accordingly, it is to be understood that the drawings and descriptions herein are proffered by way of example to facilitate comprehension of the invention and should not be construed to limit the scope thereof which is only defined by the broadest possible interpretation of the appended claims and their equivalents.

Furthermore, a contractor or other entity may provide, or be hired to provide, the apparatus and/or method such as those disclosed in the present specification and shown in the figures. For instance, the contractor may receive a bid request for a project related to designing a system for supplemental feed dilution or may offer to design such a method and accompanying system. The contractor may then provide the apparatus and/or method such as those discussed above. The contractor may provide such an apparatus and/or method by selling the apparatus and/or method or by offering to sell the apparatus and/or method, and/or the various accompanying parts and equipment to be used with and/or for said method. The contractor may provide a method and/or related equipment that are configured to meet the design criteria of a client or customer. The contractor may subcontract the fabrication, delivery, sale, or installation of a component of, or of any of the devices or of other devices contemplated for use with the method. The contractor may also maintain, modify or upgrade the provided devices and their use within the general method. The contractor may provide such maintenance or modifications by subcontracting such services or by directly providing those services.

The invention claimed is:

1. A thickener/clarifier apparatus comprising:
   a settling tank providing for the settling of particulate material residing within liquid contained within said settling tank and facilitating the formation of a clarified liquid phase in an upper region of said settling tank;
   a feedwell body disposed inside said settling tank;
   at least one open-channel infeed conduit disposed in said settling tank, said at least one open-channel infeed conduit including an inlet end and an outlet end wherein the outlet end communicates with said feedwell body for delivering thereto a liquid slurry feed stream;
   a feed pipe;
   a nozzle provided to a downstream end of the feed pipe; and
   an eductor structure located proximate the inlet end of said at least one open-channel infeed conduit and being positioned proximate to and in fluid communication with said clarified liquid phase in said settling tank for initially diluting said liquid slurry feed stream with clarified liquid from said settling tank, which, by means of primary momentum transfer responsive to the movement of the liquid slurry feed stream, entrains or draws clarified liquid from an upper region of the settling tank; the eductor structure being formed by the positioning of the nozzle relative to the inlet end of the at least one open-channel infeed conduit;
   said at least one open-channel infeed conduit being provided with at least one orifice between said inlet end and said outlet end,
   said at least one orifice being positioned proximate to and in fluid communication with said clarified liquid phase in said settling tank to draw clarified liquid from said settling tank into said at least one open-channel infeed conduit responsive to or by virtue of secondary momentum transfer between the flow of said liquid slurry feed stream in said at least one open-channel infeed conduit and said clarified liquid in said settling tank.

2. The thickener/clarifier apparatus defined in claim 1 wherein said at least one orifice is one of a plurality of orifices disposed in an upper wall portion of said at least one open-channel infeed conduit between said inlet end and said outlet end of said at least one open-channel infeed conduit and positioned proximate to and in fluid communication with said clarified liquid phase in said settling tank so as to draw clarified liquid from said settling tank into said at least one open-channel infeed conduit in response to, or by virtue of, additional momentum transfer between the flow of said liquid slurry feed stream in said at least one open-channel infeed conduit and said clarified liquid in said settling tank.

3. The thickener/clarifier apparatus defined in claim 2 wherein said plurality of orifices are provided in pairs of orifices, members of each pair of orifices being disposed transversely across said at least one open-channel infeed conduit from one another in opposing sidewalls of said at least one open-channel infeed conduit.

4. The thickener/clarifier apparatus defined in claim 2 wherein at least one of said orifices is located at a first distance from an upper edge of a respective sidewall of said at least one open-channel infeed conduit, at least another of said orifices being located at a second distance from an upper edge of a respective sidewall of said at least one open-channel infeed conduit, said second distance being substantially greater than said first distance.

5. The thickener/clarifier apparatus defined in claim 1 wherein said at least one orifice is provided with a flow guide connected to and extending outwardly from an outer side of said at least one open-channel infeed conduit.

6. The thickener/clarifier apparatus defined in claim 5 wherein said flow guide is located adjacent to said at least one orifice on a downstream side thereof.

7. The thickener/clarifier apparatus defined in claim 5 wherein said flow guide extends over and overlaps at least a portion of said at least one orifice.

8. The thickener/clarifier apparatus defined in claim 5 wherein said flow guide has a shape that parallels or corresponds to the shape of said given one of said orifices.

9. The thickener/clarifier apparatus defined in claim 5 wherein said flow guide is cut and shaped from the outer side of said at least one open-channel infeed conduit.

10. The thickener/clarifier apparatus defined in claim 1 wherein said at least one orifice has a shape taken from the group consisting of circular, oval, elongate, triangular, chevron-shaped, rectangular, and rhomboid.

11. A feedwell assembly for a thickener/clarifier tank, comprising:
   a feedwell body disposable inside the thickener/clarifier tank;
   at least one open-channel infeed conduit disposable in the thickener/clarifier tank, said at least one open-channel infeed conduit including an inlet end and an outlet end, said outlet end communicating with said feedwell body for delivering thereto a liquid slurry feed stream;
   a feed pipe;
   a nozzle provided to a downstream end of the feed pipe; and
   an eductor structure located proximate the inlet end of said at least one open-channel infeed conduit and being positioned proximate to and in fluid communication with said clarified liquid phase in said thickener/clarifier tank for initially diluting said liquid slurry feed stream with clarified liquid from said thickener/clarifier tank, which, by means of primary momentum transfer responsive to the movement of the liquid slurry feed stream, entrains or draws clarified liquid from an upper region of the thickener/clarifier tank; the eductor structure being formed by the positioning of the nozzle relative to the inlet end of the at least one open-channel infeed conduit;
   said at least one open-channel infeed conduit being provided with at least one orifice between said inlet end and said outlet end,
   said at least one orifice being positionable proximate to and in fluid communication with the clarified liquid phase in the thickener/clarifies tank to draw clarified liquid from the thickener/clarifier tank into said at least one open-channel infeed conduit responsive to or by virtue of secondary momentum transfer between the flow of said liquid slurry feed stream in said at least one open-channel infeed conduit and the clarified liquid in the thickener/clarifier tank.

12. The feedwell assembly defined in claim 11 wherein said at least one orifice is one of a plurality of orifices disposed in an upper wall portion of said at least one open-channel infeed conduit between said inlet end and said outlet end of said at least one open-channel infeed conduit and positionable proximate to and in fluid communication with the clarified liquid phase in the thickener/clarifier tank so as to draw clarified liquid from the thickener/clarifier tank into said at least one open-channel conduit in response to, or by virtue of, additional momentum transfer between the flow of said liquid slurry feed stream in said at least one open-channel conduit and the clarified liquid in the thickener/clarifier tank.

13. The feedwell assembly apparatus defined in claim 11 wherein said at least one orifice is provided with a flow guide connected to and extending outwardly from an outer side of said at least one open-channel infeed conduit.

14. The feedwell assembly apparatus defined in claim 13 wherein said flow guide is located adjacent to the at least one orifice on a downstream side thereof.

15. The feedwell assembly apparatus defined in claim 13 wherein said flow guide extends over and overlaps at least a portion of the at least one orifice.

16. The feedwell assembly apparatus defined in claim 13 wherein said flow guide is cut and shaped from the upper wall portion of the at least one open-channel infeed conduit.

17. A method of diluting an incoming slurry feed stream eventually flowing into a feedwell assembly of a thickener/clarifier tank, said feedwell assembly including a feedwell body disposable inside the thickener/clarifier tank, at least one open-channel infeed conduit disposable in the thickener/clarifier tank, said at least one open-channel infeed conduit including an inlet end and an outlet end, said outlet end communicating with said feedwell body, a nozzle attached to a downstream end of a feed pipe: and an eductor structure located proximate the inlet end of said at least one open-channel infeed conduit for initially diluting said incoming slurry feed stream with clarified liquid from said thickener/clarifier tank, which, by means of momentum transfer responsive to the movement of the incoming slurry feed stream, entrains or draws clarified liquid from an upper region of the thickener/clarifier tank; the eductor structure being formed by the positioning of the nozzle relative to the inlet end of the at least one open-channel infeed conduit; said at least one open-channel infeed conduit being provided with at least one orifice between said inlet end and said outlet end, said at least one orifice being positionable proximate to and in fluid communication with a clarified liquid phase in the thickener/clarifier tank, said method comprising the steps of:
   flowing the incoming slurry feed stream out of the nozzle and into the inlet end of the at least one open-channel infeed conduit;
   drawing clarified liquid from the thickener/clarifier tank into the at least one open-channel infeed conduit via the eductor structure in response to or by virtue of primary momentum transfer between the flow of said incoming slurry feed stream out of the nozzle and the clarified liquid in the thickener/clarifier tank;
   drawing clarified liquid from the thickener/clarifier tank into the at least one open-channel infeed conduit through the at least one orifice in response to or by virtue of secondary momentum transfer between the flow of said flowing slurry feed stream in said at least one open-channel infeed conduit and the clarified liquid in the thickener/clarifier tank;
   allowing the flowing slurry feed stream in said at least one open-channel infeed conduit to be diluted by and mix with the drawn in clarified liquid inside the at least one open-channel infeed conduit thereby producing a diluted and mixed slurry feed stream; and
   flowing the resulting diluted and mixed slurry feed stream through the outlet end of the at least one open-channel infeed conduit into the feedwell body.

18. A thickener/clarifier apparatus comprising:
   a settling tank providing for the settling of particulate material residing within liquid contained within said settling tank and facilitating the formation of a clarified liquid phase in an upper region of said settling tank;
   a feedwell body disposed inside said settling tank;
   at least one open-channel infeed conduit disposed in said settling tank, said at least one open-channel infeed conduit including an inlet end and an outlet end wherein the outlet end communicates with said feedwell body for delivering thereto a liquid slurry feed stream; and
   said at least one open-channel infeed conduit being provided with at least one orifice between said inlet end and said outlet end;
   said at least one orifice being positioned proximate to and in fluid communication with said clarified liquid phase in said settling tank to draw clarified liquid from said settling tank into said at least one open-channel infeed conduit responsive to or by virtue of momentum transfer between the flow of said liquid slurry feed stream in said at least one open-channel infeed conduit and said clarified liquid in said settling tank;

wherein said at least one orifice is provided with a flow guide connected to and extending outwardly from an outer side of said at least one open-channel infeed conduit.

19. The thickener/clarifier apparatus defined in claim 16 wherein said flow guide is located adjacent to said at least one orifice on a downstream side thereof.

20. The thickener/clarifier apparatus defined in claim 16 wherein said flow guide extends over and overlaps at least a portion of said at least one orifice.

21. The thickener/clarifier apparatus defined in claim 16 wherein said flow guide has a shape that parallels or corresponds to the shape of said given one of said orifices.

22. The thickener/clarifier apparatus defined in claim 16 wherein said flow guide is cut and shaped from the outer side of said at least one open-channel infeed conduit.

23. A feedwell assembly for a thickener/clarifier tank, comprising:

a feedwell body disposable inside the thickener/clarifier tank;

at least one open-channel infeed conduit disposable in the thickener/clarifier tank, said at least one open-channel infeed conduit including an inlet end and an outlet end, said outlet end communicating with said feedwell body for delivering thereto a liquid slurry feed stream;

said at least one open-channel infeed conduit being provided with at least one orifice between said inlet end and said outlet end;

said at least one orifice being positionable proximate to and in fluid communication with the clarified liquid phase in the thickener/clarifier tank to draw clarified liquid from the thickener/clarifier tank into said at least one open-channel infeed conduit responsive to or by virtue of momentum transfer between the flow of said liquid slurry feed stream in said at least one open-channel infeed conduit and the clarified liquid in the thickener/clarifier tank;

wherein said at least one orifice is provided with a flow guide connected to and extending outwardly from an outer side of said at least one open-channel infeed conduit.

24. The feedwell assembly apparatus defined in claim 23 wherein said flow guide is located adjacent to the at least one orifice on a downstream side thereof.

25. The feedwell assembly apparatus defined in claim 23 wherein said flow guide extends over and overlaps at least a portion of the at least one orifice.

26. The feedwell assembly apparatus defined in claim 23 wherein said flow guide is cut and shaped from the upper wall portion of the at least one open-channel infeed conduit.

* * * * *